Dec. 22, 1936.     H. Q. GRUELL     2,064,908
ELECTRODE HOLDER
Filed Oct. 3, 1935
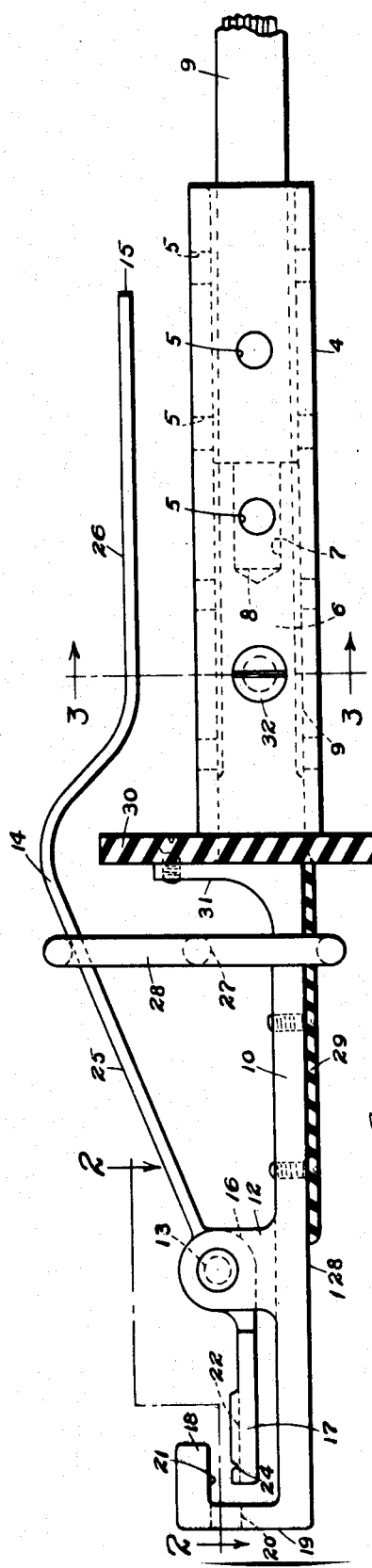
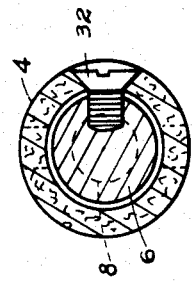
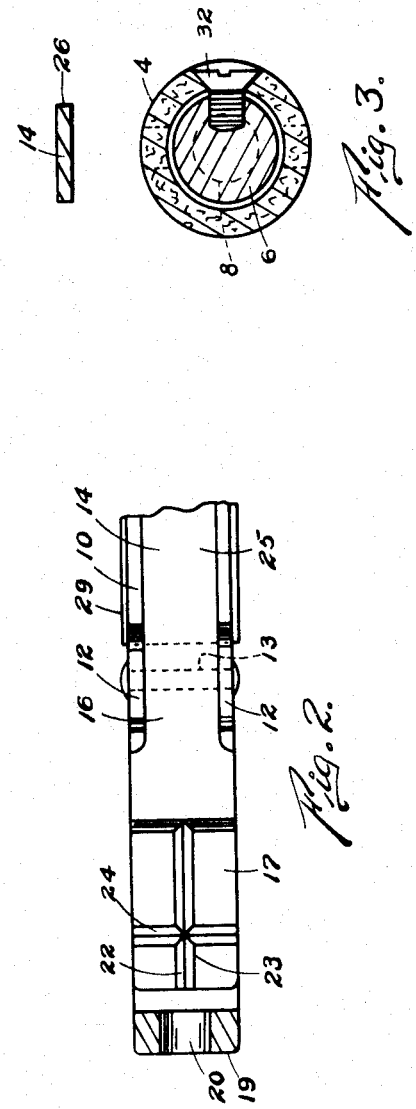
INVENTOR.
Herbert Q. Gruell
BY
Murray & Zugelter
ATTORNEYS.

Patented Dec. 22, 1936

2,064,908

UNITED STATES PATENT OFFICE 2,064,908

ELECTRODE HOLDER

Herbert Q. Gruell, Erlanger, Ky.

Application October 3, 1935, Serial No. 43,332

7 Claims. (Cl. 219—8)

The present invention relates to a holder for electrodes such as are used in the welding or brazing art.

An object of the invention is to provide a holder of the character stated, which embodies various features of construction whereby electrodes may be held securely and in convenient positions for operating upon work which is awkwardly located or accessible under difficulties.

Another object of the invention is to provide an electrode holder having means for facilitating and simplifying the application and removal of electrodes, and in which the various constituent parts are so constructed and arranged as to be unaffected by the intense heat imparted thereto by the electrode in use.

A further object of the invention is to provide an electrode holder of improved construction including means for ventilating the handle thereof, and a clamping lever substantially coextensive with the handle providing a thumb piece for facilitating partial rotation or rocking of the electrode holder in opposition to the rigidity of the heavy electricity feed cable thereof.

The foregoing and other objects are attained by the means described herein and disclosed in the accompanying drawing in which:

Fig. 1 is a side view of the electrode holder of the invention.

Fig. 2 is a cross sectional view taken on line 2—2 of Fig. 1.

Fig. 3 is a cross sectional view taken on line 3—3 of Fig. 1.

In the ordinary type of electrode holder heretofore known and used, considerable difficulty invariably was encountered in the attempt to keep the holder in condition for securely clamping the electrodes, due to the fact that the intense heat generated at the electrode was transmitted to the various parts of the holder and quickly destroyed the resiliency of the springs or resilient parts relied upon for a clamping force upon the electrode. The prior devices were objectionable also in that the electrode was insertable only at substantially right angles to the axis of the holder, thereby rendering difficult the welding of overhead objects. The present device embodies various features of construction whereby overhead structures may be operated upon with ease and comfort to the operator, with the electrode projecting substantially forwardly of the holder, rather than laterally therefrom. The structural design of the present holder permits also an increased flexibility such as will permit operating upon objects which are accessible only under various difficulties. Particular attention is directed to the fact that the improved device of this invention employs no screw threaded chuck to be ruined or rendered inoperative by the intense heat of the welding operation, nor does it employ any type of tempered spring which is so limited in area as to be incapable of dissipating heat imparted thereto during the welding operation.

With reference to Figure 1 of the accompanying drawing, the character 4 indicates a handle construction of suitable insulating material and having formed therein a series of apertures 5 for ventilating the handle. Within the handle is supported the handle core 6 which has formed therein a recess or bore 7, in which is secured the end 8 of a wire strand cable 9. The end 8 of the cable may be secured within the bore 7 in any suitable manner such as by means of solder, wedges, screws or the like. It will be noted that the circumference of the core 6 is spaced from the interior of the handle 4, as indicated at 9, to furnish an air space for ventilating the handle and liberating heat from the core 6.

Extending forwardly of the core 6 is a metallic forward extension 10 which performs as a conductor of electricity from the cable 9 to the forward end of the holder. The forward extension 10 carries one or more spaced brackets or lugs 12 adapted to receive a pin, rivet or the like, 13, which provides a fulcrum for the combined clamp and torque control handle indicated generally by the character 14. The combined clamp and torque control handle is constructed of spring metal, at least from the fulcrum 13 to the rear end 15 thereof. Forwardly of the fulcrum or of the boss 16 which forms part of the fulcrum, the member 14 is developed to provide a clamp plate, or jaw 17, which plate or jaw extends longitudinally of the forward extension 10 and beneath an overhanging lip 18 at the terminal end of the forward extension. It will be noted that the nose of the device is of substantially C shape, with the overhanging lip 18 supported by an apertured transverse plate portion 19. The aperture 20 of portion 19 is adapted to receive therein an electrode which will rest in abutting relationship upon the inner face 21 of the overhanging lip 18, while the clamp plate or jaw 17 applies a lateral force to the end of the electrode. When an electrode is inserted in the aperture 20 so as to extend axially of the holder, the inner end of the electrode rests within a friction groove 22 of the clamping plate or jaw, and this groove preferably is provided with sufficiently sharp edges 23 such as will effectively prevent accidental rotation of the electrode within the aperture 20. A second friction groove 24 crosses the groove 22 and extends laterally of the clamping plate for the purpose of frictionally holding an electrode crosswise of the clamping plate. Thus an electrode may be supported either forwardly in alignment with the holder, or laterally thereof across the clamping plate 17.

As stated previously, the combined clamp and torque control handle 14 is constructed of spring metal and is sufficiently large in area to radiate whatever heat may be imparted thereto through the clamping plate during the welding operation. It is found desirable to employ as the clamp and torque control handle, a long flat strip of spring steel properly tempered and exposed to the air so completely as to insure maximum heat radiation. It will be noted that the inclined intermediate portion 25 of the member 14 is in no manner housed or encased as would be the helical spring heretofore employed in devices of the character under consideration. This inclined portion 25, being directly connected to the clamping plate 17 through the boss 16 thereof, is the hottest part of the spring steel handle member 14, and it has been discovered, in practice, that the long incline 25 radiates sufficient heat to insure a normal temperature of that portion of member 14 which overlies the fibrous or insulated handle 4. It will be understood, of course, that the entire length of the member performs as a heat radiator, as under normal conditions of use even the handle 4 reaches a temperature considerably higher than that of the surrounding atmosphere.

Due to the heating of the handle 4 through the extension 10 and core 6, it is found that added comfort to the operator's hand is furnished by making the rearward extension 26 of the clamp handle substantially co-extensive in length with the length of the insulated handle 4, so that the operator in grasping both handles conveniently spaces a considerable area of his hand from the handle 4. In the absence of the extension 26, an operator would be required to hold the heated handle 4 with the full contact of his hand thereon, which would produce fatiguing effects on account of exposure of the entire hand to the radiation of heat from the large area of the handle 4.

The spaced rearward extension 26 of the clamp control handle performs also a second function, namely, that of facilitating bodily rotation of the holder, as is often necessary for reaching weldable areas which are not easily accessible. The bodily rotation of the electrode holder is accomplished only by the use of considerable force, as the rigidity of the wire strand cable 9 opposes such rotational movement. The extension 26, therefore, furnishes the necessary leverage to effect a bodily rotation of the holder without unnecessary strain upon the operator's hand and wrist.

It will be noted that the combined clamp and torque control handle is so arranged that any force applied thereto by the operator's fingers results in tightening rather than loosening the clamping action upon the electrode in the region of the clamping plate or jaw 17. As a result of this construction, it is possible to provide a very simple means of maintaining the clamping plate securely in abutment upon the electrode. One form of simple securing means is disclosed, this being in the shape of a ring or link 28 which is preferably oblong in plan, and which is provided with a cross piece 27 to prevent the ring or link from becoming disassociated from the extension 10. To effect a secure clamping action upon the electrode, it is necessary only for the operator to depress the handle 28 toward the handle 4 while the electrode holder is held with its nose 19 elevated, whereupon the ring or link falls into position, such as the position shown in Figure 1, for maintaining the inclined portion 25 in a strained or flexed condition. Conversely, to release the clamping action, the operator need only lower the nose of the device and apply force to the extension 26, whereupon the ring or link will release its hold and gravitate toward the fulcrum 13, thereby to free the clamp control handle 14.

The character 29 indicates a strip of fibre or other insulating material which is suitably secured to the face 128 of extension 10 and disposed along so much of the area of said face as to prevent metal to metal contact between the ring 28 and any metallic part of extension 10. The purpose of the insulation strip 29 is to eliminate the possibility of arcing at the ring, which would have the effect of further heating the electrode holder and possibly welding the ring or link 28 thereto. A second sheet 30 of insulated material may be fixed to a flange 31 of extension 10, to provide a transverse shield or guard for protecting the operator's hand from the injurious effects of hot flying metal.

The electrode holder herein illustrated and described has been found entirely free of all complications arising from splattering molten metal, as there are no springs or other elements to catch such metal and become caked therewith so as to render inoperative the moving parts. The upper face of incline 25 is smooth and will deflect practically all flying particles directed thereto, so that under no circumstances will the clamping arrangement become inoperative or impaired in its effectiveness. The radiating area of member 14, which is large compared to that of an ordinary helical spring, preserves the temper thereof with the result that such part outlasts the other elements of the device. Noteworthy also is the simplicity of construction, and especially the simplicity and ease of operation, of the securing means for the clamping handle.

The improvement which comprises the provision of means for mounting the electrode axially of the holder rather than laterally thereof, is of considerable importance. The construction disclosed avoids the use of complicated and ineffective forms of jaws or chucks, and simplifies and facilitates operating in close quarters and upon overhead and vertical work.

It is to be understood that various modifications and changes in the structural details of the device may be made, within the scope of the appended claims, without departing from the spirit of the invention.

What is claimed is:

1. A holder for welding electrodes which comprises in combination, a handle and a forward extension supported by the handle, including means for holding an electrode in substantial alignment with the handle, an electrode clamp adjacent to a terminal end of said extension, and a clamp control element likewise having a handle portion disposed longitudinally of and substantially coextensively with the first mentioned handle, in spaced relation thereto so as to be grasped conjointly therewith, and including a resilient portion inclined toward said forward extension, and means for maintaining a clamped relationship of the clamp upon an electrode, said means comprising a sliding link adapted to slide toward the electrode clamp to release the electrode upon movement of the handles toward one another.

2. A holder for welding electrodes which comprises in combination, a handle and a forward extension supported by the handle, a nose on the extension comprising a rearwardly extended lip overhanging a portion of said extension, a clamp plate movable toward and from the extension beneath said lip for clamping and releasing an electrode to be held against said lip, means for pivotally mounting the clamp plate upon the extension intermediate said nose and said handle, and a clamp actuating element comprising a substantially straight resilient part having a large heat-radiating area.

3. A holder for welding electrodes which comprises in combination, a handle and a forward extension supported by the handle, a nose on the extension comprising a lip overhanging a portion of said extension, a clamp plate movable toward and from the extension beneath said lip for clamping and releasing an electrode to be held against said lip, means for pivotally mounting the clamp plate upon the extension intermediate said nose and said handle, a clamp actuating element comprising a substantially straight resilient part having a large heat-radiating area, and a rearwardly extending handle portion on said actuating element, disposed alongside the first mentioned handle in substantial coextensive relationship therewith.

4. A holder for welding electrodes which comprises in combination, a handle and a forward extension supported by the handle, an apertured nose on the extension comprising a lip turned rearwardly toward the handle in spaced relationship with said extension for overhanging a portion of said extension, a clamp plate movable toward and from the extension beneath said lip for clamping and releasing an electrode inserted in the aperture of the nose and held against said lip, means for pivotally mounting the clamp plate upon the extension intermediate said nose and said handle, a clamp actuating element comprising a substantially straight resilient part having a large heat-radiating area and including an inclined face extending rearwardly from the clamp plate, and means for maintaining a strained condition of said resilient part of the clamp actuating element.

5. A holder for welding electrodes which comprises in combination, a handle and a forward extension supported by the handle, a nose on the extension comprising an apertured transverse wall and a lip extending rearwardly of said wall to overhang a portion of said extension, a clamp plate movable toward and from the lip and past the aperture of the transverse wall, for clamping and releasing an electrode extending through said aperture and in abutment upon the lip, and a clamp plate actuator for moving the plate as aforesaid, and including a rearward extension disposed rearwardly toward and alongside of the first mentioned handle.

6. A holder for welding electrodes which comprises in combination, a handle and a forward extension supported by the handle, a nose on the extension comprising an apertured transverse wall and a lip extending rearwardly of said wall to overhang a portion of said extension, a clamp plate movable toward and from the lip and past the aperture of the transverse wall, for clamping and releasing an electrode extending through said aperture and in abutment upon the lip, and a clamp plate actuator for moving the plate as aforesaid.

7. A holder for welding electrodes which comprises in combination, a handle and a forward extension supported by the handle, a nose on the extension comprising an apertured transverse wall and a lip extending rearwardly of said wall to overhang a portion of said extension, a clamp plate movable toward and from the lip and past the aperture of the transverse wall, for clamping and releasing an electrode extending through said aperture and in abutment upon the lip, and a clamp plate actuator for moving the plate as aforesaid, said actuator including an inclined face diverging outwardly and rearwardly from the forward extension and toward the handle, and a member slidable along said extension and said inclined face, for urging the clamp plate actuator toward the clamping position of the clamp plate upon the electrode.

HERBERT Q. GRUELL.